United States Patent [19]

Cook et al.

[11] 4,162,829
[45] Jul. 31, 1979

[54] PHOTOGRAPHIC FILM DRIVE SYSTEM EMPLOYING INERTIA DUMPER/ENERGY DISSIPATER

[75] Inventors: Gerald H. Cook, Lynnfield; Bernard W. Ruck, Milford, both of Mass.

[73] Assignee: Polaroid Corporation, Cambridge, Mass.

[21] Appl. No.: 867,015

[22] Filed: Jan. 5, 1978

[51] Int. Cl.² .............................................. G03B 1/00
[52] U.S. Cl. .................................... 352/166; 352/130; 352/72; 352/35; 242/186; 242/205
[58] Field of Search ................... 242/18 B, 46.6, 46.7, 242/46.8, 205, 207; 352/35, 166, 187, 190, 72, 130

[56] References Cited

U.S. PATENT DOCUMENTS

| | | | |
|---|---|---|---|
| 2,196,358 | 4/1940 | Heinisch | 352/35 |
| 2,912,178 | 11/1959 | Schuyler | 242/55.12 |
| 3,514,197 | 11/1967 | Sho | 352/91 |
| 3,643,469 | 2/1972 | Enomoto | 242/71 |
| 3,719,335 | 3/1973 | Kurasawa | 242/186 |
| 3,920,318 | 11/1975 | Frezzolini | 352/35 |
| 3,947,187 | 3/1976 | Murray | 352/72 |
| 4,087,165 | 5/1978 | Pasturczak | 242/205 |

FOREIGN PATENT DOCUMENTS 334966 of 1936 Italy ......................................... 352/166

*Primary Examiner*—Monroe H. Hayes
*Attorney, Agent, or Firm*—Frederick A. Goettel, Jr.

[57] ABSTRACT

A yieldably resilient shock absorber is provided, which is disposed in driving relationship between a pair of gears in a photographic apparatus drive system. The yieldably resistant shock absorber is confined within an annular chamber or channel defined by complementary structure of the two gears and is adapted to absorb forces due to sudden stoppage of the film strip or to resistance to movement of the film strip by compressing the resilient shock absorber member within the confining channel. Upon cessation of the forces imposed upon the yieldable resilient shock absorber, frictional engagement between the outer surfaces of the deformed shock absorber member and the confining walls defining the channel result in a controlled release of the absorbed energy.

5 Claims, 9 Drawing Figures

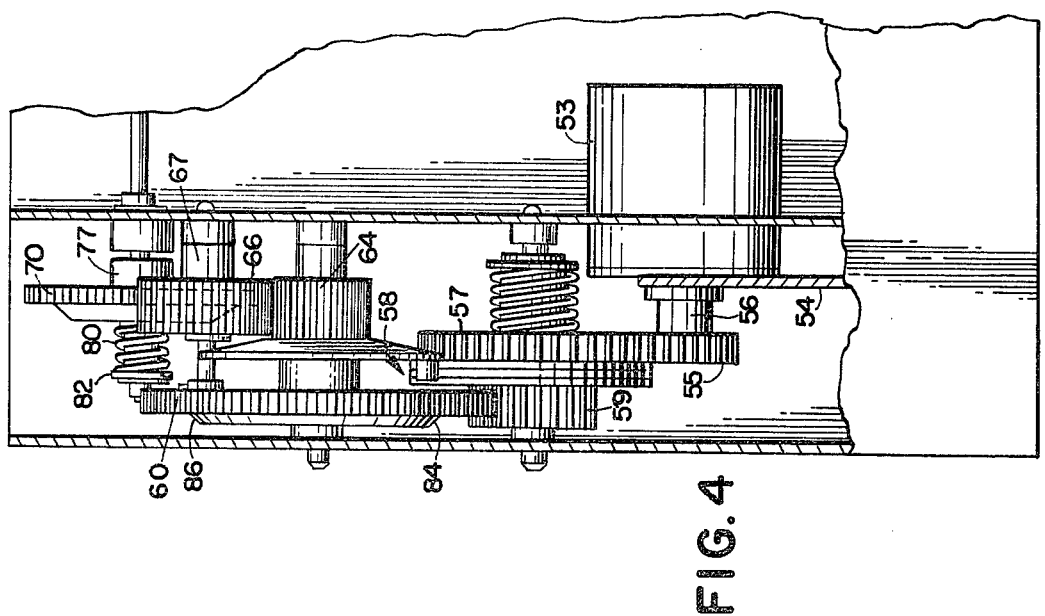
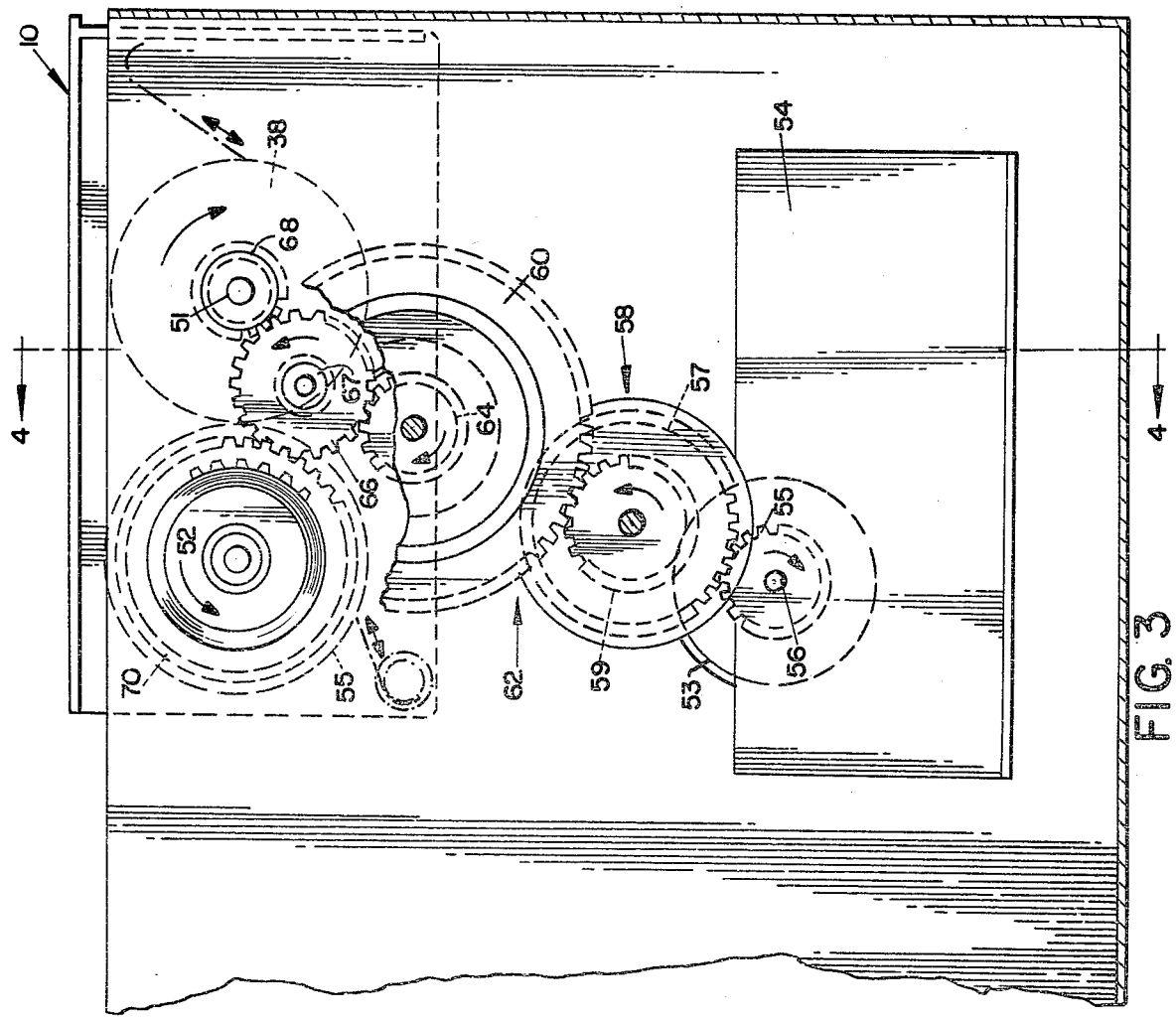

PHOTOGRAPHIC FILM DRIVE SYSTEM EMPLOYING INERTIA DUMPER/ENERGY DISSIPATER

BACKGROUND OF THE INVENTION

1. Field of the Invention

This invention relates to photographic apparatus and, more particularly, to an improved drive system for advancing and rewinding film in a film cassette inserted into the photographic apparatus.

2. Description of the Prior Art

Recent technological advances have made it possible to provide multipurpose motion picture cassettes from which motion picture film need not be removed during exposure, processing and projection operations. Exemplary of such systems are those described in U.S. Pat. No. 3,615,127 of Edwin H. Land, issued Oct. 26, 1971; and U.S. Pat. No. 3,771,861 of Edwin H. Land, issued Nov. 13, 1973.

Such systems utilize replaceable film cassettes, each containing a strip of film, a supply of processing composition for the film, and an internally programmed processor responsive to manipulation of the film in the cassette for applying the processing composition to the film after its exposure. Initially the cassette is inserted into a camera for exposure of the film. After exposure, it is loaded into a projector apparatus which is adapted to receive the cassette and has a drive apparatus for manipulating the film in the cassette. The film is manipulated in a sequence determined by a signal provided by the cassette that indicates whether or not the film has been processed.

When a cassette containing unprocessed film is inserted into the viewer/processor, movement of the film activates the processor, developing the film to produce a series of fixed, visible, projectable images as the film is driven by the drive system. Thereafter, the apparatus manipulates the film in an optical system, causing it to be projected for viewing. The film is then rewound from a takeup spool onto a supply spool for storage and subsequent reuse. The speed at which the film is rewound exceeds the speed at which the film is advanced during the projection mode. Finally, the cassette is automatically ejected. In response to insertion of a cassette containing processed film, the apparatus simply projects the film, rewinds it, and then ejects the cassette.

When the film in the cassette is driven from one spool to the other and the film reaches a given end, film advancement abruptly ceases. This stopping of film motion halts rotation of the film spool. In the rewind mode, where relatively continuous high speed motion of the film drive is employed, the system develops considerable kinetic energy such that the abrupt halting of the film produces a large peak force on the cassette elements, including an extremely high film tension.

U.S. Pat. No. 3,947,187 entitled "Photographic Film Drive System Employing Inertia Dumper" of Joseph E. Murray, Jr., issued Mar. 30, 1976, and assigned to the assignee of the present invention, relates to a device for temporarily absorbing this kinetic energy of the drive system so as to reduce the shock or peak forces applied to the cassette at the end of high speed film run, particularly when the film is rewound onto the supply spool.

This patent provides for a film drive system including an inertia dumper consisting of a pair of drive gears intercoupled through a torsion spring having a much lower spring rate than the film strip so that at the end of the high speed rewind of the film onto the supply spool, the peak energy or shock generated upon cessation of film movement is absorbed by the spring which permits limited rotational movement between the pair of drive elements against the bias of the spring. Thereafter, the preloaded torsion spring returns the drive elements to their normal angular positions relative to each other.

The inertia dumper system described in the above-cited patent is quite satisfactory in absorbing the kinetic energy at the end of a conventional high speed rewind of a film strip which has already been processed. A drawback of this inertia dumper system, however, has been realized in the specially modified rewind mode which the internally programmed cassette undergoes during the processing of the film strip.

The problem encounter will be appreciated upon a brief description of the operation of the viewer upon an unprocessed cassette. Upon insertion of an unprocessed cassette into the viewer, the viewer senses that the cassette is unprocessed and the following operations are performed upon the cassette. The viewer initially goes into a so-called "dummy" project mode wherein the takeup reel of the cassette is driven to assure that all film has been removed from the supply reel and wound upon the takeup reel. such an operation assures positioning of an aperture provided in the film strip in a position relative to an aperture engaging pull strip which forms a part of the processor of the cassette. Such positioning assures that locking engagement of the pull strip with the aperture in the film strip will occur upon initiation of the processing/rewind mode of operation. Following the initial "dummy" project, the viewer shifts to a develop/rewind mode of operation wherein the following functions occur. The drive system is shifted into driving engagement with the supply reel and the drive motor is actuated to rotate the supply reel to advance the film from the takeup reel to the supply reel. The viewer subcycle circuit is programmed to effect an initial one-half second of motor rotation after which the motor is stopped for three seconds prior to starting the motor again to advance the remaining film strip past the processor and back onto the supply reel. During the first half second of film movement, the motor advances approximately eight inches of film during which time the pull strip permanently engages the aperture provided in the film strip and further advancement of the film serves to rupture a development fluid pod contained in the processor in a manner to be described below. During the following three seconds of motor stop, the development fluid under force of gravity flows to the bottom of the processor to assure a supply of processing fluid at the initiation of the processing rewind.

During the processing/rewind mode of operation, the supply reel of the cassette is being driven by the drive system against the bias of the inertia dumper spring. During the initial half second of motor rotation, i.e., before the three second stop, the film strip engages the pull strip and through the pull strip delivers a force to an initially sealed tear tab provided on the processing fluid reservoir and removes this tear tab thereby permitting passage of the processing fluid to its desired location for application to the exposed film strip. During this removal of the tear tab closure from the processing fluid reservoir, the resisting force of the tear tab, prior to, and during its removal from the reservoir, results in a force sufficient to overcome the bias or preload of the spring in the inertia dumper and actually causes the spring to "wind up" during the period of time that this resisting force is experienced.

Substantially immediately following removal of the tear tab, the kinetic energy stored in the inertia dumper spring during the above-described "wind up" is immediately released and this energy is imparted through the drive system to effect a sudden rotational acceleration of the supply spool in its rewind direction. This sudden acceleration of the supply spool in turn imparts, through the film strip, a similar acceleration to the takeup spool which contains at this time a substantial majority of the developed but unprocessed film strip. This sudden acceleration of the film laden takeup spool results in a rotational movement of the takeup spool causing at least the outer convolutions of film upon the takeup spool to become loose and extend out beyond the circumferential edges of the spool. Following the three second delay and initiation of the high speed process/rewind mode of operation, problems have been encountered wherein the loose outer convolutions of the film strip upon the takeup spool have jammed within other cassette components thereby resulting in an inability of the viewer to properly process the film strip in the cassette.

SUMMARY OF THE INVENTION

The present invention provides an inertia dumper arrangement for use in a photographic apparatus drive system of the type described hereinabove which has an energy absorbing means which is capable of absorbing energy transmitted through the drive system due to abrupt stoppage of the film strip or resistance to movement of the film strip and to also dissipate the abosrbed energy in order to avoid additional high tension to be imparted upon the film strip.

More specifically, the present invention provides a yieldably resilient shock absorber disposed in driving relationship between a pair of gears in the photographic apparatus drive system. The yieldably resistant shock absorber is confined within an annular chamber or channel and is adapted to absorb forces due to sudden stoppage of the film strip or to resistance to movement of the film strip by compressing the resilient shock absorber member within the confining channel. Upon cessation of the forces imposed upon the yieldable resilient shock absorber, frictional engagement between the outer surfaces of the deformed shock absorber member and the confining walls defining the channel result in a controlled released of the absorbed energy.

More specifically, in the illustrated embodiment the photographic apparatus has a novel film drive system including an inertia dumper consisting of a pair of drive elements or gears intercoupled throuh an elongated length of resilient deformable rubber material having a much lower spring rate than the film strip. The elongated length of rubber is confined in a channel defined by complementary structure of the pair of gears and is configured to drivingly interconnect the pair of gears when they are driven in the rewind direction of the photographic apparatus. When a load is placed upon the drive members due to a sudden shock such as occurs at the end of film rewind or at the initiation of tear tab separation in the multipurpose film cassette, the resilient rubber member is caused to compress within the chamber defined by the complementary structure of the gears and, as a result, serves to absorb the shock or resisting forces. Upon cessation of these forces, for example, shut off of the driving motor or upon separation of the tear tab, the energy stored within the resilient rubber element is not abruptly released, but is dissipated due to frictional forces between the outer surface of the rubber element and the enclosing walls of the channel defined by the complementary structure of the drive elements.

BRIEF DESCRIPTION OF THE DRAWINGS

The novel features that are considered characteristic of the invention are set forth with particularity in the appended claims. The invention itself, however, both as to its organization and its method of operation, will best be understood from the following description of the preferred embodiment when read in connection with the accompanying drawings wherein like numbers have been employed in the different figures to denote the same parts and wherein:

FIG. 3 is a partial vertical cross sectional view taken on line 3—3 of FIG. 1 showing the film drive system of the present invention during rewind drive of the film;

FIG. 4 is a view taken on the line 4—4 of FIG. 3;

DETAILED DESCRIPTION OF THE PREFERRED EMBODIMENT

Figure 1:
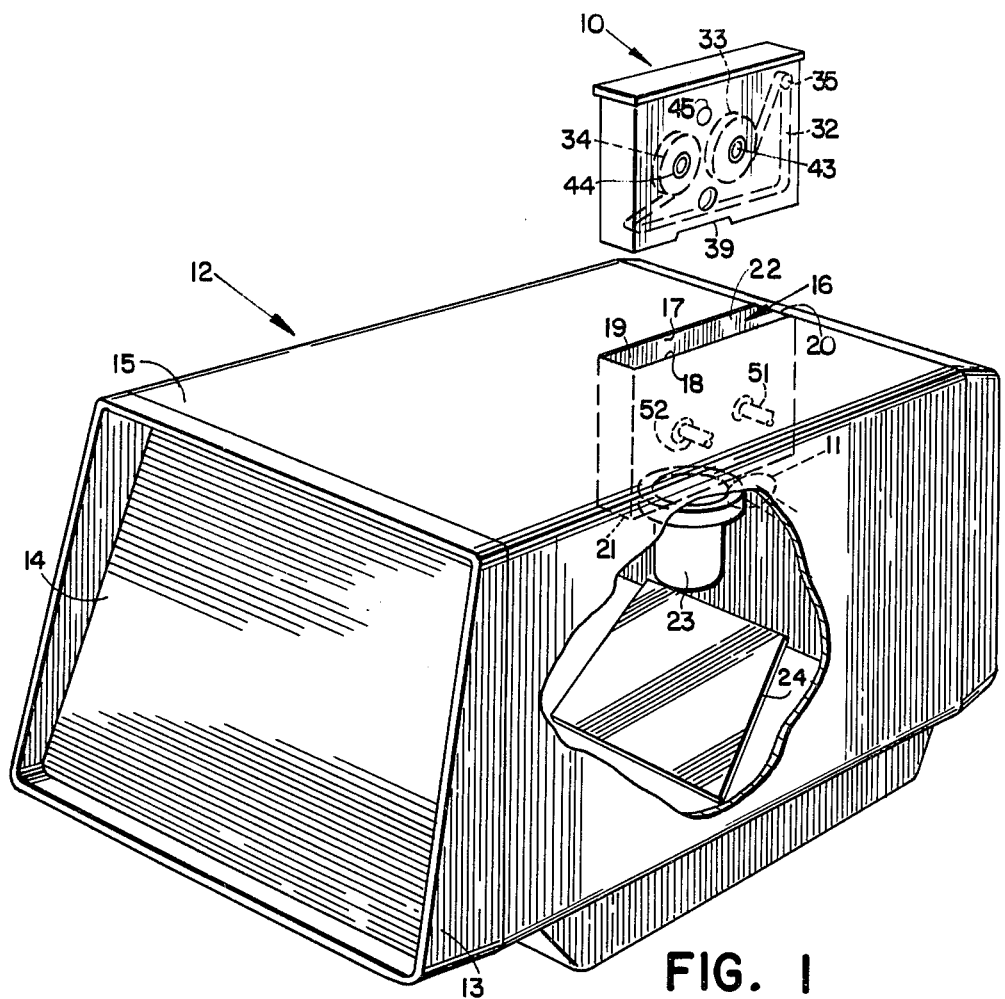
FIG. 1 is a diagrammatic perspective view of a motion picture film handling cassette and a motion picture projector apparatus embodying the features of the present invention.

Referring now to the drawings and, more particularly, to FIG. 1, reference numeral 10 generally designates a film handling cassette which is employed in conjunction with a viewer/processor 12. The cassette is of the multipurpose type which is designed to be first exposed in a motion picture camera to record scene images on the film. The cassette is then adapted to be loaded into the viewer which first subjects the film strip to a processing treatment, thereafter dries the film strip, and projects the recorded images for viewing. The cassette 10 is of the type described in U.S. Pat. No. 3,895,862 issued to Joseph A. Stella et al. on July 22, 1975 and will be described in some detail hereinbelow. The viewer 12 is of the type generally illustrated in U.S. Pat. No. 3,791,725 issued to Richard W. Young on Feb. 12, 1974 and having a control system similar to the type described in U.S. Pat. No. 3,941,465 issued to Erwin E. Figge et al. on Mar. 2, 1976, both assigned to the assignee of the present invention.

The viewer 12 is a rear projection viewer comprising a box-like housing 13 which includes a front viewing screen 14. In the top surface 15 of the housing, there is a cassette receiving slot or well 16 which extends to and is in communication with the top surface 15. In this embodiment, the well 16 is made up of side walls 17 and 18, end walls 19 and 20 and bottom wall 21 which together form a box-like, open ended slot 16 in communication with the top surface 15 through the open top 22 of the well. Mounted beneath the cassette receiving well 16 is a projection lens assembly 23 and a reflector element 24 which, in conjunction with a conventional projection lamp 11 is configured to project film images forwardly to the rear of the transparent screen 14. As shown in FIG. 1, the cassette 10 is oriented over the cassette receiving well 16 in proper position for loading within the receiving well. Loading is accomplished by moving the cassette downwardly to slide it within the receiving well 16.

Figure 2:
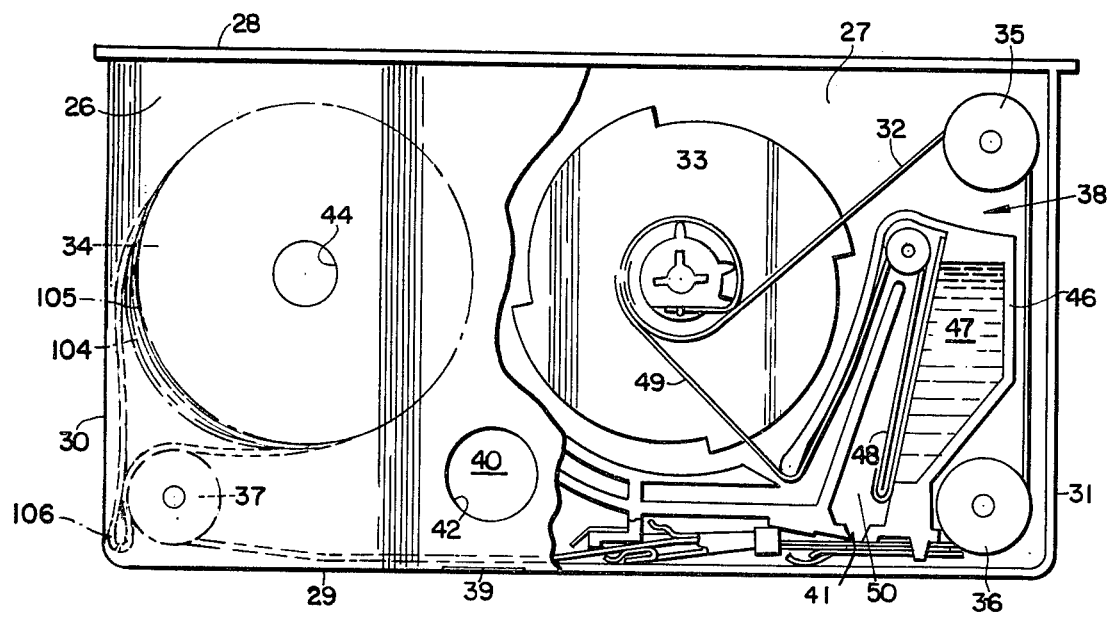
FIG. 2 is a diagrammatic side elevational view of a film cassette for use in the viewer of FIG. 1 with part of the front wall thereof cut away and other portions thereof in partial section to illustrate the internal working components.

As best seen in FIG. 2, the cassette 10 comprises a housing generally designated by the reference numeral 25 and taking the form of a rectangular parallelepiped having a pair of exterior side walls 26 and 27 connected by top, bottom and end walls 28, 29, 30 and 31 respectively. Within the housing 25, the film strip 32 is connected at the opposite ends to supply and takeup spools 33 and 34, respectively, for movement through a series of linear flights or runs defined by a bobulator roller 35, idler guide roller 36 and a snubbing roller 37. The run of the film strip 32 between the guide roller 36 and the snubbing roller 37, in passing from the supply spool 33 to the takeup spool 34 traverses a processor, designated generally by the reference numeral 38, and an exposure/projection aperture 39 positioned in the bottom housing wall 29 under a reflecting prism 40 located adjacent ventilating openings (not shown) provided in the side wall 27. A plurality of apertures are located in the other side wall 26 to facilitate cassette operation. Included are an illumination aperture 42 configured to permit entrance of illumination for projection purposes. Apertures 43 and 44 permit access of external drive members, and aperture 45 is configured to receive a latching shaft of the apparatus for locating and locking the cassette within the well 16, as will be more fully explained hereinafter.

The processor 38 includes a reservoir or pod 46 containing processing fluid 47, which is initially sealed by a tear strip 48 which is connected in turn to a film strip engaging pull strip 49. The construction and operation of the pull strip 49 is fully disclosed in U.S. Pat. No. 3,895,862 issued July 22, 1975 to Joseph A. Stella et al., and will not be further described here except to note that upon initiation of a processing cycle, the pull strip becomes engaged by an aperture (not shown) in the trailing end portion of the film strip 32 to pull the tear strip 48 away from the pod or reservoir 46 to allow processing fluid 47 contained within the pod 46 to flow into a chamber 50 closed at its lower end by an applicator nozzle 41 which is adapted to deposit the processing fluid onto the film strip surface. At the completion of tear strip removal, the pull strip 49 becomes wound between the convolutions of the film strip wrapped on the supply spool 33 whereas the tear strip 48 becomes separated and remains within the processor reservoir 46. The pull strip 49 and film strip 32 are illustrated in FIG. 2 in their engaged position, just prior to experiencing the resisting force imparted by the initial separation of the tear tab 48 from the reservoir 46 to which it is attached.

When the cassette is inserted into the viewer, a latching shaft (not shown) of the apparatus is inserted into aperture 45 of the cassette and actuates the extension of a pair of drive spindles 51 and 52 into operative engagement within apertures 43 and 44 in the cassette side wall 26. Hence, the spindles 51 and 52 provide means for coupling the projector drive to the cassette film spools.

Figure 5:
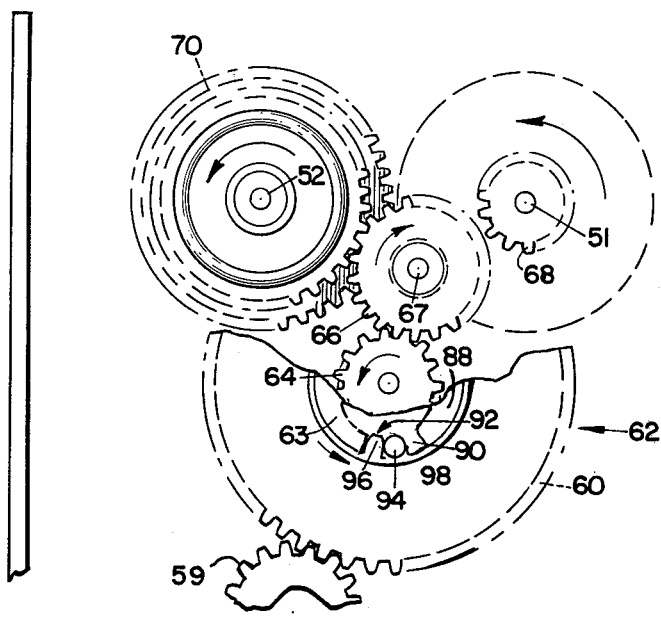
FIG. 5 is a fragmentary view of a portion of the gear train of FIG. 3 as positioned during forward drive of the film.

Referring now to FIG. 3 which shows the cassette 10 in operative position within the viewer, the drive system for spindles 51 and 52 will now be described. The film drive system includes an actuatable power drive means, such as a reversible DC motor 53 to provide torque for driving the supply spool drive spindle 51 and the takeup spool drive spindle 52. The motor 53 is supported within the viewer housing upon a frame member 54. A pinion gear 55 is keyed to the motor output shaft 56 and is in engagement with a spur gear 57. Spur gear 57 is coupled through a relatively high torque slip clutch 58 to another pinion gear 59. Pinion gear 59 in turn is in engagement with a spur gear 60 which is part of the inertia dumper generally designated by reference numeral 62. The inertia dumper 62 provides means for resiliently coupling the drive motor to the spool coupling spindles at least in one direction of drive rotation and comprises another drive element consisting of pinion gear 64 which is coaxial with the spur gear 60 and a deformable resilient means, such as the length of deformable rubber or similar material 63 disposed in a driving relationship between the gears 60 and 64. The interrelationship between gears 60 and 64 and the deformable resilient element 63 will be described hereinafter in detail in connection with the description of FIG. 6. The inertia dumper pinion gear 64 meshes with a spur gear 66 which is positioned upon a movable support shaft 67 which permits the gear 66 to be either in engagement with gear 68 mounted on supply spool drive spindle 51 when the spur gear 66 is driven in a counterclockwise direction as illustrated in FIG. 3, or in engagement with gear 70 mounted on the takeup spool drive spindle 52 when gear 66 is rotating clockwise as shown in FIG. 5. That is, because of the drag between gear 66 and its shaft 67, reversal of the motor and hence the gear 64 displaces the gear 66 left or right between the positions shown in FIGS. 3 and 5.

Figure 6:
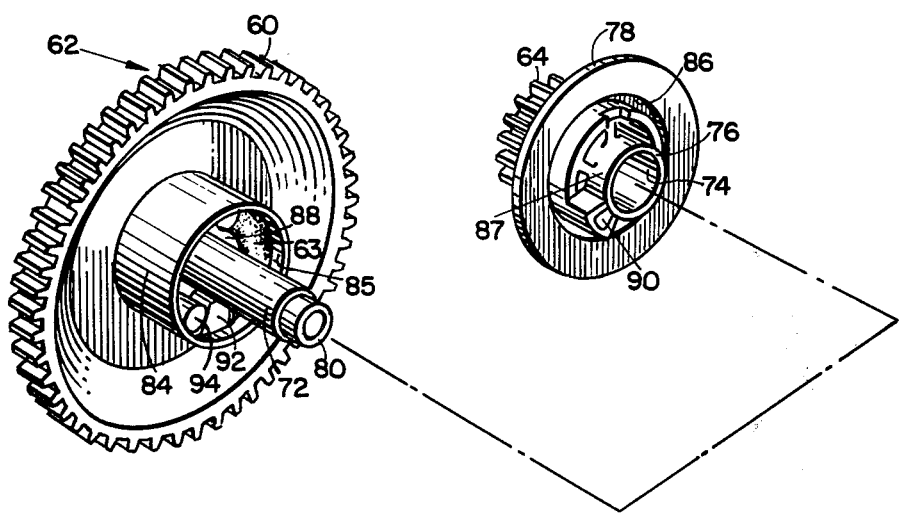
FIG. 6 is an exploded view of the elements forming the inertia dumper of the present invention.

Referring to FIG. 6, as stated previously, the inertia dumper 62 is comprised of a pair of gears 60 and 64 which are provided with a deformable resilient energy absorbing element 63 located with respect to the two gears to provide the driving relationship therebetween. The gear 60 has at its center an outwardly projecting axle 72 which extends into an axial bore 74 which commences in a tubular projection 76 on gear 64. The bore 74 continues through flange-like central portion 78 and through gear 64. When the gear elements are assembled, the axle 72 extends completely through bore 74, and the end 80 of axle 72 is engaged by a snap fastener 82 to maintain the parts in assembled relationship. Gear 60 is further provided with a tubular housing or sleeve 84 which, when assembled with the pinion gear 64 receives the tubular projection 76 of the gear 64 therein. The end of the tubular sleeve 84 fits within a circular groove 86 provided on the flange 78 to space the gear 64 from the gear 60. The inner diameter of the inner surface 85 of the tubular housing 84 and the diameter of the outer surface 87 of the tubular projection 76 are such that an enclosed annular chamber 88 concentric with the axle 72 is formed therebetween when the gears 60 and 64 are in their assembled relationship.

To provide a substantially direct drive in one direction, that is, when gear 64 is to be driven in a counterclockwise direction, the gear 64 includes a projecting rib 90 shown in FIGS. 5 and 6 which is configured to engage a drive transmitting member or stop 92 comprised of a hard rubber abutment or block 94 adjacent a strengthening projection 96 formed integrally with the tubular housing 84 of gear 60. FIG. 5 shows the above-described elements with gears in engagement for driving the takeup spool 34 in a counterclockwise direction. It will be seen that the left hand side 98 (as viewed in FIG. 5) of the projecting rib 90 of gear 64 is drivingly engaged by the driving abutment 94 of the driving gear 60. The described arrangement accordingly provides a substantially direct drive relation between gears 60 and 64 when the gear 64 is rotated clockwise or, that is, in the forward advancement mode. As shown in FIG. 5, when the film is being advanced in the forward direction from the supply spool 33 onto the takeup spool 34, the inertia dumper is rotating counterclockwise and there is direct drive between gears 60 and 64 at this time.

Figure 8:
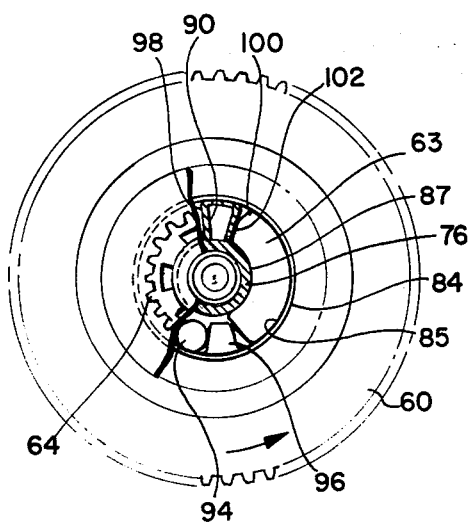
FIG. 8 is a diagrammatic partially cut away plan view of the inertia dumper of the present invention showing the elements thereof in driving relation for the rewind mode of operation.
Figure 9:
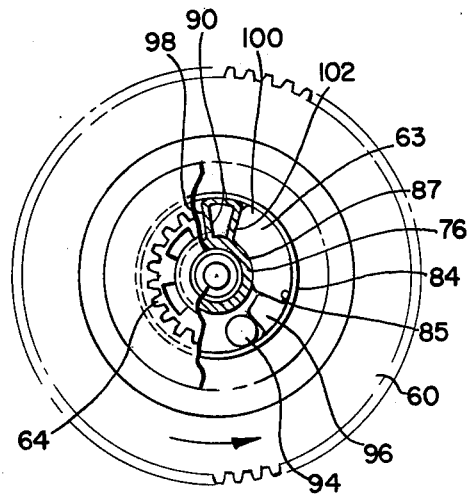
FIG. 9 is a view similar to FIG. 8 showing the conditions of the elements of the inertia dumper following the absorption of a resisting force or shock in the photographic film cassette.

On the other hand, with reference to FIGS. 3 and 5, when gears 60 and 64 are driven in a clockwise direction, there is initially limited angular movement between the gears as the driven gear 60 rotates clockwise with the gear 64 remaining stationary until the free driving end 100 of the elongated resilient deformable element 63 rotates into contact with the right hand side 102 (as viewed in FIG. 5) of the projecting rib 90 of gear 64. The inertia dumper assembly 62 is shown in such a position in FIG. 8 of the drawings. In FIGS. 8 and 9, the elements of the inertia dumper 62 are viewed from the opposite side of the assembly than the views of FIGS. 3 and 5, and accordingly, as indicated by the arrows on FIGS. 8 and 9, counterclockwise rotation of the inertia dumper 62 in these figures corresponds to the clockwise rotation depicted in FIG. 3. It will be seen then, with reference to FIG. 8, that when the spur gear 60 is driven in the counterclockwise direction, as shown in FIG. 8, it will in turn drive the gear 64 through engagement of the strengthening projection 96 with the yieldably resistant shock absorber element 63 and through driving contact of the end 100 of the shock absorber element 60 with the right hand side 102 of the rib 90. FIG. 8 illustrates the inertia dumper elements in their position immediately prior to driving engagement. When the drive motor 53 is actuated to drive gear 60 and in turn, gear 64, the yieldably resilient shock absorber element 63 will partially compress within the annular chamber or channel 88 defined by, among others, the inner surface 85 of the tubular housing 84 and the outer surface 87 of the tubular projection 76.

One function of the yieldably resilient shock absorber 63 in the mechanical transmission system of the present invention is to serve to absorb peak loads, or tension, which occur in the film strip at the end of the high speed rewind cycle as mentioned hereinabove. The use of a torsion spring in a gear arrangement as illustrated in the present invention to serve as such an inertia dumper at the end of high speed rewind is described in detail in previously cited U.S. Pat. No. 3,947,187, which patent is herein incorporated by reference thereto, in its entirety. As described in detail in the above-referenced patent, at the completion of the high speed rewind operation, when the leading end of the film is reached, the film strip, the supply spool 33 and its associated drive spindle 51 stop abruptly. This abrupt cessation of rotation tends to cause a sharp energy peak or shock to be imparted to the cassette elements, such as the film spool 33 and the film strip 32. This peak energy or shock is dampened and/or dissipated in the present invention by permitting angular rotation between the gears 60 and 64 as a result of compression of the yieldably resilient shock absorber member 63 as the motor 53 continues to run in the rewind direction. The inertia dumper 62 of the present invention is illustrated in such a position wherein the resilient shock absorber member 63 has been compressed within the annular chamber 88 and is in frictional contact with the surfaces defining this chamber. Following shut off of the motor, the energy stored in the resilient element 63 is thereafter effective to turn the gears 60 and 64 to their relative positions substantially as illustrated in FIG. 8. The yieldably resilient shock absorber element 63 as a result of such deformation serves to reduce the peak tension which the film 32 experiences following termination of drive at the end of rewind substantially as well as the torsion spring arrangement of the above-referenced patent.

In addition to the above-described function, the inertia dumper 62 of the present invention serves an additional extremely advantageous function when used in conjunction with the multipurpose film cassette 10 and drive system described hereinabove.

As previously explained, when the pull strip 49 of the cassette 10 is operatively engaged with the film strip 32 and is wound with the film strip upon the supply spool 33 to initiate separation of the tear tab 48 from the fluid containing reservoir 46, the drive system is driving through the inertia dumper 32 in the rewind direction, i.e., is driving through the yieldably resistant shock absorber element 63. As the resistance of the sealed tear tab 48 is encountered by the drive system, a force is imparted upon the system which results in increased tension in the film strip 32. In the prior art arrangement, with the torsion spring inertia dumper, when the resistance of the tear tab was experienced, the torsion spring would "wind up" in response to the resistance of the tear tab.

As mentioned above, substantially immediately following removal of the tear tab, the kinetic energy stored in the torsion spring inertia dumper of the prior art during the above described "wind up" is immediately released. This energy is imparted through the drive system to effect a sudden rotational acceleration of the supply spool 33 in its rewind direction. This sudden acceleration of the supply spool in turn imparted a sudden high tension to the film strip and, through the film strip, caused a similar acceleration of the takeup spool 34 which, at this time in the cycle contained a substantial majority of the exposed, but unprocessed film strip. The sudden acceleration of the film laden takeup spool resulted in a rotational movement of the takeup spool causing at least the outer convolutions of film upon the takeup spool 34 to become loose as represented by reference numeral 104 in FIG. 2 and extend out beyond the circumferential edge of the spool. Subsequent initiation of the high speed process/rewind mode of operation have resulted in a jam of one of the outer convolutions 104 between the snubber roller 37 and the inside of the end wall 30, as shown at 106 in FIG. 2.

With the inertia dumper arrangment 62 of the present invention, when the resisting force of the tear tab 48 is experienced by the drive system, the yieldably resilient absorber element 63 will compress as illustrated in FIG. 9 in the same manner that it compresses or deforms following the termination of a rewind cycle. During this time, the outer surfaces of the rubber inertia dumper element 63 are in tight frictional contact with the surfaces defining the annular chamber or channel 88. As a result, immediately following separation of the tear tab, the frictional engagement between the outer surfaces of the deformed rubber shock absorber element 63 and the walls defining the annular chamber 88 result in a frictional resistance to the return of the inertia dumper elements, i.e. gears 60, 64, to their initial relative positions as illustrated in FIG. 8. As a result, no large quantity of stored energy is immediately delivered through the drive system to the supply spool and, as a further result no large increase in film tension is experienced at this time thereby precluding the potential jamming problem found to occyr with the torsion spring system of the prior art.

Figure 7:
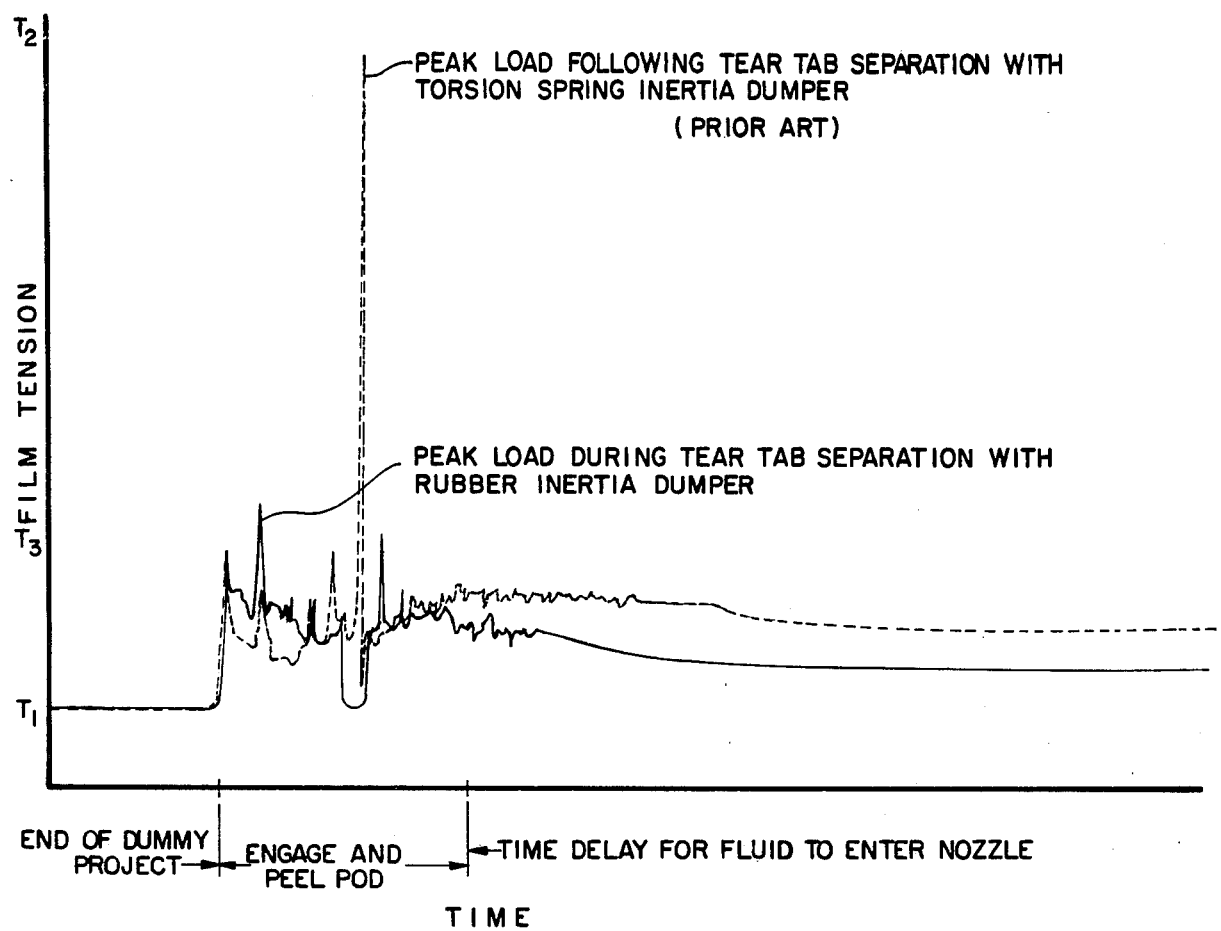
FIG. 7 is a graph depicting the film tension occuring during the initial seconds of the modified rewind/processing mode of operation with and without the inertia dumper of the present invention.

The operation of the inertia dumper will now be explained by referring to FIG. 7 wherein the film tension during the processing cycle is plotted under conditions with the novel inertia dumper arrangment of the present invention and with the prior art torsion spring inertia dumper arrangement. As can be seen from this figure, during the initial dummy project and prior to engagement of the pull strip, the film experiences a running load tension $T_1$. Upon engagement of the pull strip, the tension rises rapidly and varies somewhat erratically until the point where the tear tab is removed. At this point in the prior art arrangement, the tension in the film strip rose dramatically to a tension $T_2$, identified by the large vertical spike, as a result of the "unwinding" of the torsion spring. Still referring to FIG. 7, it is seen that the peak tension $T_3$ experienced with the inertia dumper system of the present invention is substantially less than the peak experienced with the torsion spring arrangement and, at the point of tear tab removal, a low point of tension, substantially equal to the running load $T_1$, is experienced by the film strip.

In the preferred embodiment, the yieldably resilient shock absorber element 63 is made from a rubber material such as neoprene or the like and is additionally of an elongated length having a substantially circular cross section which is disposed within the annular chamber 88 such that it is partially frictionally engaged with the walls defining the annular chamber. The exact dimensions and properties of the yieldably resilient shock absorber element 63 will be dependent upon the magnitude of the forces with which it is designed to absorb and the rate at which it is desired to have it dissipate the stored energy upon release of forces imparted upon it.

Accordingly, it should be appreciated that a mechanical driving system has been provided having an inertia absorption system wherein sudden shock forces or forces resisting movement of the drive system may be absorbed and wherein upon the release of the tension or force causing the energy absorbed, releases the absorbed energy in a controlled fashion thereby precluding potential damage or undesirable results occuring from the sudden release of the stored energy.

While the invention has been described with particularlity with respect to the details of a specific embodiment thereof, the invention is applicable to other types of mechanical drive systems and photographic apparatus utilizing drive systems for film. It should be understood that this invention may be practiced or embodied in other ways without departing from the spirit or essential character thereof. Hence, the preferred embodiment described herein is illustrative and not restrictive, the scope of the invention being indicated by the appended claims and all variations which come within the meaning of the claims are intended to be embraced therein.

We claim:

1. In a mechanical transmission system for advancing an elongated web of material from a first spool, to which one of its ends is attached and around which a major portion of its length is initially coiled, onto and around a second spool, to which the other of its ends is attached, the improvement comprising:

a driving member mounted for rotation about a given axis;

means coupled to the second spool for defining a first arcuate surface spaced a fixed distance radially from said axis and extending parallel to said axis;

means coupled to said driving member for defining a second arcuate surface facing said first arcuate surface in spaced apart parallel relationship to define a channel therebetween extending circumferentially of said axis;

a pair of abutment surfaces respectively connected to said driving member and said first arcuate surface defining means to be disposed in facing relationship in circumferential registry with said channel; and a yieldably resilient shock absorber disposed along said channel intermediate said abutment surfaces, whereby rotary motion is imparted to the second spool from said driving member through said shock absorber which is adapted to absorb shock forces by compressing when the web has been completely uncoiled from the first spool or sudden increased resistance to web advancement is otherwise experienced, said shock absorber being structured to expand widthwise of said channel to be engaged between said first and second arcuate surfaces as it absorbs said shock forces or forces resulting from increased resistance to web advancement, whereby the dissipation of energy so absorbed therein is resisted by frictinal forces between said shock absorber and said arcuate surfaces so that said shock absorber only gradually returns to its original expanded configuration upon termination of power to said driving member.

2. The apparatus of claim 1 wherein said yieldably resilient shock absorber comprises an elongated deformable rubber element disposed lengthwise within said channel.

3. Photographic apparatus for use with a film handling cassette, the cassette including a cassette housing retaining a photographic film strip and means for guiding the film strip along a given path within the cassette housing, said guiding means including at least one film spool to which one end of the film strip is attached and upon which the film strip is wound, the film strip being drawn from the film spool as the film strip is advanced in a given direction within said cassette housing, the film strip being subject to abrupt stoppage within the cassette housing when the film strip is advanced to the one end, and to a resistance to advancement of the film strip caused by other elements of the cassette, and the film strip and the film guiding means having a high spring rate, said apparatus comprising means for receiving the cassette, means for cooperating with the cassette when it is received in said receiving means for driving the film strip in at least said given direction along the given path within the cassette housing, said film driving means including a driving member mounted for rotation about a given axis; means coupled to the film spool for defining a first arcuate surface spaced a distance radially from said axis and extending parallel to said axis; means coupled to said driving member for defining a second arcuate surface facing said first arcuate surface in spaced apart parallel relationship to define a channel therebetween extending circumferentially of said axis; a pair of abutment surfaces respectively connected to said driving member and said first arcuate surface, said abutment surfaces defining means to be disposed in facing relationship in circumferential registry with said channel; and a yieldably resilient shock absorber disposed along said channel intermediate said abutment surfaces, whereby rotary motion is imparted to the film spool from said driving member through said shock absorber which is adapted to absorb shock forces by compressing when the film strip abruptly stops moving or a sudden increased resistance to film strip advancement is otherwise experienced, said shock absorber being structured to expand widthwise of said channel to be engaged between said first and second arcuate surfaces as it absorbs said shock forces or forces resulting from increased resistance to film strip advancement, whereby the dissipation of energy so absorbed therein is resisted by frictional forces between said shock absorber and said arcuate surfaces so that said shock absorber only gradually returns to its original expanded configuration upon termination of driving power to said driving member.

4. Photographic apparatus for use with a cassette having a cassette housing, a pair of film spools rotatably supported within the cassette housing, and a strip of photographic film having a given spring rate wound on and extending between the film spools with the respective ends of the film strip affixed to the film spools, the film strip being configured for advancement within the cassette by winding the film strip on one film spool as it is unwound from the other film spool and subject to abrupt stoppage of advancement as the film strip reaches the film strip and affixed to the other film spool, the cassette also including processing means having an initially sealed processing fluid reservoir which is adapted to have the seal removed in response to a force imparted thereon by the film strip advancing in a given direction thereby imparting a resisting force to the advancement of the film strip, said apparatus comprising:

a driving member mounted for rotation about a given axis;

means coupled to one of the film spools for defining a first arcuate surface spaced a fixed distance radially from said axis and extending parallel to said axis;

means coupled to said driving member for defining a second arcuate surface facing said first arcuate surface in spaced apart parallel relationship to define a channel therebetween extending circumferentially of said axis;

a pair of abutment surfaces respectively connected to said driving member and said first arcuate surface defining means to be disposed in facing relationship in circumferential registry with said channel; and a yieldably resilient shock absorber disposed along said channel intermediate said abutment surfaces, whereby rotary motion is imparted to the second spool from said driving member through said shock absorber when said spool is being driven in the direction to open the initially sealed fluid reservoir, said yieldably resilient shock absorber being adapted to absorb the forces caused by the sudden increased resistance to film advancement caused by the opening of the reservoir, said shock absorber being structured to expand widthwise of said channel to be engaged between said first and second arcuate surfaces as it absorbs said forces resulting from the increased resistance to film advancement whereby the dissipation of energy so absorbed therein is resisted by frictional forces between said shock absorber and said arcuate surfaces so that said shock absorber only gradually returns to its original expanded configuration upon termination of power to said driving member.

5. The apparatus of claim 4 wherein said yieldably resistant shock absorber comprises an elongated rubber element disposed lengthwise within said channel.

* * * * *